United States Patent
Volkel et al.

(10) Patent No.: US 9,624,116 B2
(45) Date of Patent: Apr. 18, 2017

(54) SYSTEMS AND APPARATUS FOR REMOVAL OF HARMFUL ALGAE BLOOMS (HAB) AND TRANSPARENT EXOPOLYMER PARTICLES (TEP)

(71) Applicant: Palo Alto Research Center Incorporated, Palo Alto, CA (US)

(72) Inventors: Armin R. Volkel, Mountain View, CA (US); Meng H. Lean, Santa Clara, CA (US); Norine E. Chang, Menlo Park, CA (US); Huangpin B. Hsieh, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 698 days.

(21) Appl. No.: 13/740,752

(22) Filed: Jan. 14, 2013

(65) Prior Publication Data

US 2014/0197113 A1 Jul. 17, 2014

(51) Int. Cl.
*E02B 15/04* (2006.01)
*C02F 1/38* (2006.01)
(Continued)

(52) U.S. Cl.
CPC .............. *C02F 1/38* (2013.01); *B01D 21/265* (2013.01); *E02B 15/04* (2013.01);
(Continued)

(58) Field of Classification Search
CPC ...... E02B 15/04; E02B 15/046; E02B 15/048; E02B 15/104; B63C 9/28; Y10S 210/923; C02F 1/24; B63B 59/08
(Continued)

(56) References Cited

U.S. PATENT DOCUMENTS

| | | | | |
|---|---|---|---|---|
| 4,795,553 A | * | 1/1989 | Giffard | B03B 5/626 209/459 |
| 5,248,421 A | * | 9/1993 | Robertson | B01D 17/0217 209/723 |

(Continued)

FOREIGN PATENT DOCUMENTS

| | | | |
|---|---|---|---|
| CN | 2659797 Y | * | 12/2004 |
| CN | 101596929 A | * | 12/2009 |

(Continued)

OTHER PUBLICATIONS

HAB RDTT, 2008, Harmful Algal Bloom Research, Development, demonstration, and Technology Transfer National Workshop Report, Dortch, Q. et al., Woods Hole, Massachusetts.
(Continued)

*Primary Examiner* — Krishnan S Menon
*Assistant Examiner* — Waqaas Ali
(74) *Attorney, Agent, or Firm* — Fay Sharpe LLP

(57) ABSTRACT

A mobile HEB and TEP mitigation device includes a mobile body capable of movement within or upon a body of water. Located within the mobile body is a hydrodynamic separation system which includes a water inlet, a hydrodynamic separation unit and a collection tank. The hydrodynamic separation unit includes two outputs, one for a clean stream output line containing clean water and arranged to re-circulate the clean water, and another for a concentrate stream output line, the concentrate stream output line configured to place concentrated water containing potentially harmful bio-organic materials into the collection tank. Also included on the mobile body is a power source and an engine/steering unit, wherein the steering portion of the engine/steering unit provides a capacity to move the mobile body in an intended direction. The mitigation device may (Continued)

also be used as an embedded part of an on-shore arrangement.

20 Claims, 17 Drawing Sheets

(51) Int. Cl.
    *B63C 9/28*     (2006.01)
    *B01D 21/26*     (2006.01)
    *B63B 38/00*     (2006.01)
    *C02F 1/52*     (2006.01)
    *C02F 103/08*     (2006.01)

(52) U.S. Cl.
    CPC .......... *B01D 2221/06* (2013.01); *B63B 38/00* (2013.01); *B63C 9/28* (2013.01); *C02F 1/52* (2013.01); *C02F 2103/08* (2013.01); *C02F 2201/008* (2013.01); *C02F 2201/009* (2013.01); *C02F 2303/24* (2013.01); *Y02W 10/37* (2015.05); *Y10S 210/923* (2013.01)

(58) Field of Classification Search
    USPC ............................................ 210/242.1, 747.6
    See application file for complete search history.

(56) References Cited

U.S. PATENT DOCUMENTS

| | | | | |
|---|---|---|---|---|
| 5,593,579 | A * | 1/1997 | Reynolds | B01D 29/01 210/242.1 |
| 8,654,312 | B2 * | 2/2014 | Jung | G02B 3/0006 355/53 |
| 2005/0133464 | A1 * | 6/2005 | Vannahme | B01D 21/0012 210/776 |
| 2008/0128283 | A1 * | 6/2008 | Van Rensburg | C02F 1/487 204/661 |
| 2008/0128331 | A1 | 6/2008 | Lean et al. | |
| 2008/0230458 | A1 | 9/2008 | Lean et al. | |
| 2009/0045117 | A1 * | 2/2009 | de Strulle | B01D 17/042 210/198.1 |
| 2009/0050538 | A1 | 2/2009 | Lean et al. | |
| 2009/0114601 | A1 | 5/2009 | Lean et al. | |
| 2009/0114607 | A1 | 5/2009 | Lean et al. | |
| 2009/0283452 | A1 | 11/2009 | Lean et al. | |
| 2009/0283455 | A1 * | 11/2009 | Lean | B03B 5/32 209/555 |
| 2010/0072142 | A1 | 3/2010 | Lean et al. | |
| 2010/0140092 | A1 | 6/2010 | Volkel et al. | |
| 2010/0314263 | A1 | 12/2010 | Lean et al. | |
| 2010/0314323 | A1 * | 12/2010 | Lean | A01D 44/00 210/703 |
| 2010/0314325 | A1 | 12/2010 | Lean et al. | |
| 2010/0314327 | A1 | 12/2010 | Lean et al. | |
| 2011/0108491 | A1 * | 5/2011 | Lean | C02F 1/041 210/737 |
| 2012/0145546 | A1 | 6/2012 | Volkel et al. | |
| 2012/0145647 | A1 | 6/2012 | Volkel et al. | |
| 2012/0152814 | A1 | 6/2012 | Lean et al. | |
| 2012/0152855 | A1 | 6/2012 | Lean et al. | |

FOREIGN PATENT DOCUMENTS

| | | | | |
|---|---|---|---|---|
| CN | 102381449 A | * | 3/2012 | |
| CN | 102476703 A | * | 5/2012 | |
| DE | 102006002437 A1 | * | 7/2007 | ............ A01B 9/005 |
| EP | 1038840 A2 | * | 9/2000 | ............ C02F 1/722 |
| JP | 2007319002 A | * | 12/2007 | |
| WO | WO 2004111347 A1 | * | 12/2004 | ........... E02B 15/048 |

OTHER PUBLICATIONS

Jewett, E.B., et al., 2008, Harmful Algal Bloom Management and Response: Assessment and Plan, Interagency Working Group on Harmful Algal Blooms, Hypoxia, and Human Health of the Joint Subcommittee on Ocean Science and Thechnology, Washington, DC.
Di Ferrante, "Quantitative Colorimetric Assay of Acid Mucopolysaccharides", J. Biol. Chem., 1954, 209:579-583.

* cited by examiner

SYSTEMS AND APPARATUS FOR REMOVAL OF HARMFUL ALGAE BLOOMS (HAB) AND TRANSPARENT EXOPOLYMER PARTICLES (TEP)

BACKGROUND

The marine (saltwater) and freshwater of many countries are increasingly impacted by the environmental and socio-economic problem of harmful algal blooms (HABs). HABs are proliferations of marine and/or freshwater algae that can produce toxins or accumulate in sufficient numbers to alter ecosystems in detrimental ways. These blooms are often referred to as "red tides," but it is now recognized that they may also be a variety of colors (e.g., green, yellow, brown, or even without visible color), depending on the type and number of organisms present. The majority of HAB species are phytoplankton, which are micro algae (microscopic, single-celled algae) or cyanobacteria that live suspended in water. This harmful algae also includes some micro algae that live attached to plants or other substrates as well as some species of macro algae (seaweeds). HABs are found in expanding numbers of locations and are also increasing in duration and severity. Additionally new HAB species are being identified that pose new threats to human and ecosystem health.

HAB deplete nutrients and oxygen, shade the deeper water areas, limit light-dependent processes, and release toxins that affect fish and shellfish, which are part of the human food chain. For water intakes HAB events place higher demands on the filtration systems, requiring not just more frequent cleaning, but also mitigation against toxin release and dispersion. In severe cases, HAB events force the shut-down of services to prevent irrecoverable damage to treatment systems. In addition, polysaccharide secretions of HAB bypass all stages of filtration except for the reverse osmosis (RO) membrane. Further, Transparent Exopolymer Particles (TEP) which are primarily hydrophilic polymeric substances that exist as gel networks or slimes and can split during passage through even ultra-fine (UF) membrane pores and thereafter reform back into such gel networks or slimes.

If moderate to large algae cells (greater than 15 to 20 microns in diameter) exceed 15,000 cells per mL of water, it is referred to as a bloom. For small microscopic cells (less than 1-5 microns) concentrations in excess of about 100,000 cells per mL are considered a bloom. The concentration of algal cells on the surface can vary during the day, and can be 20-50 times the 'integrated' density in calm conditions. However, impacts can result from lower densities, for example, a bloom of a toxic species in a shellfish harvesting area could pose a threat at densities as low as 5 cells per ml.

Current approaches to minimize the impact of HABs include:
1. Prevention, i.e., minimizing nutrient pollution or spreading of known HAB species to new locations;
2. Control, i.e., the direct reduction or containment of existing blooms, which can include mechanical, biological, chemical, or genetic approaches; and
3. Mitigation, i.e., monitoring, short-term prediction, and event response to minimize the impact of HAB on humans.

The control approaches are limited by the need to keep the algae intact during the removal to prevent the release of excess toxins. Any chemical and/or biological approach should also be algae specific, since most algae present in any water body are beneficial to the environment and should not be eradicated with the harmful algae species. Examples for "mechanical removal" include the physical removal of macro algae or the application of clay as a flocculent to sediment out cells and their toxins from the water. The second approach leads to a deposition of a potentially toxic algae layer at the bottom of the water body, which may impact the living organisms there.

It may be desirable to remove such toxic algae in order to eliminate them as a source of poison for other marine life, such as, for example, shell fish. Doing so without rupturing the cells of the micro-organisms becomes increasingly critical so as to avoid the release of toxins or other harmful matter that may contaminate the ecosystem.

A particularly difficult aspect of such blooms is that they often extend off-shore (while at other times they do reach shorelines). Therefore, reaching the blooms when off-shore adds a further complicating factor.

It is therefore deemed desirable to provide systems (and/or devices) and processes to mitigate NABS and/or TEPs that exist off-shore, near-shore, or on-shore.

INCORPORATION BY REFERENCE

The following co-pending and commonly assigned applications, naming Lean et al. as inventors, the disclosures of each being totally incorporated herein by reference, are mentioned: U.S. Published Application No. 2009/0050538, entitled, "Serpentine Structures for Continuous Flow Particle Separations", by Lean et al.; U.S. Published Application No. 2008/0128331, entitled, "Particle Separation and Concentration System", by Lean et al.; U.S. Published Application No. 2008/0230458, entitled, "Vortex Structure for High Throughput Continuous Flow Separation", by Lean et al.; U.S. Published Application No. 2009/0114601, entitled, "Device and Method for Dynamic Processing in Water Purification", by Lean et al.; U.S. Published Application No. 2009/0114607, entitled, "Fluidic Device and Method for Separation of Neutrally Buoyant Particles", by Lean et al.; U.S. Published Application No. 2010/140092, entitled, "Flow De-Ionization Using Independently Controlled Voltages", by Armin R. Volkel et al.; U.S. Published Application No. 2010-0314323, entitled, "Method and Apparatus for Continuous Flow Membrane-Less Algae Dewatering", by Lean et al.; U.S. Published Application No. 2009/0283455, entitled, "Fluidic Structures for Membraneless Particle Separation", by Lean et al.; U.S. Published Application No. 2009/0283452, entitled "Method and Apparatus for Splitting Fluid Flow in a Membrane-less Particle Separation System", by Lean et al.; U.S. Published Application No. 2011-0108491, entitled, "Desalination Using Supercritical Water and Spiral Separation", by Lean et al.; U.S. Published Application No. 2010/0072142, entitled, "Method and System for Seeding with Mature Floc to Accelerate Aggregation in a Water Treatment Process", by Lean et al.; U.S. Published Application No. 2010-0314263, entitled, "Stand-Alone Integrated Water Treatment System for Distributed Water Supply to Small Communities", by Lean et al.; U.S. Published Application No. 2010-0314325, entitled, "Spiral Mixer for Floc Conditioning", by Lean et al.; U.S. Published Application No. 2010-0314327, entitled, "Platform Technology for Industrial Separations", by Lean et al.; U.S. Published Application No. 2012-0145647 A1, entitled, "Electrocoagulation System", by Volkel et al.; U.S. Published Application No. 2012-0145546 A1, entitled, "All-Electric Coagulant Generation System", by Volkel et al.; U.S. Published Application No. 2012-0152814 A1, entitled, "Membrane Bioreactor (MBR) And Moving Bed Bioreactor (MBBR) Configurations For Wastewater Treatment", by Meng H. Lean et al.; and U.S. Published Application No. 2012-0152855 A1, entitled "Systems and Apparatus for Seawater Organics Removal", by Lean et al.

BRIEF DESCRIPTION

A mobile HAB and TEP mitigation device includes a mobile body capable of movement within or upon a body of water. Located within the mobile body is a hydrodynamic separation system, wherein the hydrodynamic separation system includes a water inlet for inputting water from the body of water within or upon which the mobile body is located, a hydrodynamic separation unit arranged to receive the water from the water inlet, and a collection tank, wherein the hydrodynamic separation unit includes two (bi-furcated) outputs, a first output being a clean stream output line containing clean water and arranged to re-circulate the clean water back into the body of water, and a second output being a concentrate stream output line, the concentrate stream output line configured to place water containing the concentrated harmful bio-organics found in at least in HAB and TEP infested waters into the collection tank. Also included on the mobile body is a power source and an engineering/steering unit and are in operative connection to receive power to motivate movement of the mobile body, and wherein the steering portion of the engine/steering unit provides a capacity to move the mobile body in an intended direction.

DETAILED DESCRIPTION

Figure 1:
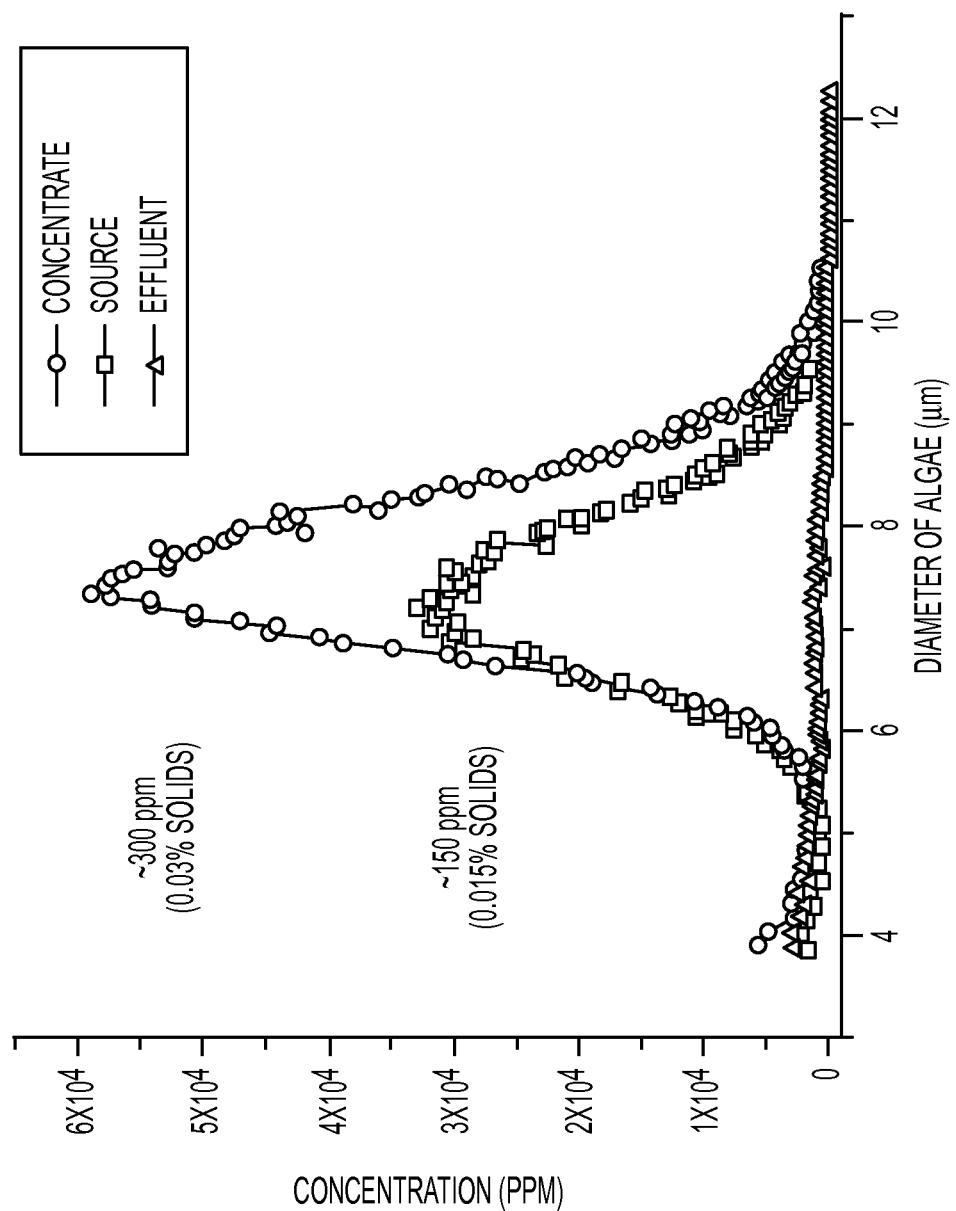
FIG. 1 is a graph showing results for removal of algae using the pretreatment device in a form of the presently described embodiments.

The presently described embodiments relate to various fluidic structures, implementations and selected fabrication techniques to realize construction of bio-organic removal systems and/or devices including membrane-less hydrodynamic separators (i.e., separation units) for the removal of bio-organic matter from seawater and/or freshwater, where the removal maintains the bio-organic material, such as algae, in a non-ruptured state. It is to be appreciated the hydrodynamic separator units are configured to operate without the need of an external power source. However, this does not preclude the use of, in certain embodiments, a pump to provide controlled flow to and through a hydrodynamic separation system.

It will be understood that variations of these hydrodynamic separation units may be realized based on dimensional scale and channel architecture. However, it is contemplated that the embodiments described herein are scalable to span macro-scale (1-10 L/min) single-channel flow rates.

In certain planar embodiments of the hydrodynamic separation unit, convenient stacking techniques are contemplated. In this regard, a hydrodynamic separator unit may consist of at least one module defining an arc in the range of approximately 180 to 360 degrees.

The presently contemplated embodiments may be fabricated from inexpensive materials such as inexpensive plastics, or other suitable materials.

In addition, a stacked parallel multi-channel embodiment provides for quick assembly and disassembly. Notable features of such a contemplated unit include convenient inlet manifolds and outlet manifolds that include a bifurcating mechanism or splitter to split the fluid into a particulate or concentrate stream and a clean fluid stream. The contemplated embodiments also allow for a multiple stage device operative to output an extremely narrow band of particulates.

Further, the membrane-less hydrodynamic separation systems (devices) and configurations thereof provide, in some embodiments, for the introduction of coagulating or flocculating agents as part of the system (device) though the same are not required As has been noted above, the mitigation of excessive occurrence of biological and/or biologic matter (e.g., HABs) is a major concern. One mentioned type of algae bloom to which the present concepts may be applied is "red tide". Over 100 species of harmful algae have been identified in red tides, most commonly *Alexandrium tamarensis Balech, Ceratium furca, Gonyaulux polyhedral, Noctiluca scintillans*, and *Prorocentrum minimum* were identified (http://www.red-tide.org/new). For example, identified harmful algae include: in Malaysia, *Pyrodinium bahamense* var. *compressum*; in the Philippines, *Pyrodinium bahamense* var.

*compressum, Gymnodinium catenatum, Alexandrium tamiyavanichii*; in Thailand, *Noctiluca scintillans, Ceratium furca, Trichodesmium erythraeum, Chaetoceros, Cosinodiscusss, Skeletonema, Mesodinium rubrum, Cochlodinium*sp.; in Vietnam, *Phaeocystis globosa*; and in Indonesia, *Skeletonema costatum, Chaetoceros, Bacterisastrum, Thalassothrix, Thalassionema, Rhizosolenia, Pseudonitszchia, Prorocentrum minimum, Gonyaulax* sp., *Trichodesmium erythraeum*.

While in some locations the red tide effect is periodical, in other areas harmful algae bloom (HAB) is present year-round. A HAB event is generally defined as an occurrence having algae micro-organisms in an amount of $10^6$ cells/L or greater. It may be necessary to remove such algae in order to eliminate them as a source of poison for other marine life, such as, for example, shell fish. Doing so without rupturing the cells of the micro-organisms becomes increasingly critical so as to avoid the release of toxins or other harmful matter.

Shear rate represents a concern with regard to the removal of micro-organisms that may be toxic or harmful. Of specific concern is the shear caused by passage through narrow obstacles such as the fluid intake structure (e.g., seawater and or freshwater).

Shear rate during operation of some filtration systems may cause the rupture of cell walls. This can be problematic in several ways. First, it may cause the release of toxic or infectious matter. It is known that pressure drops of up to 200 psi may rupture algae cells. Therefore, it is important that shear rate be controlled at a level below typical filtration operation shear rates, and specifically below that known to rupture algae so as not to cause the noted problems.

The membrane-less hydrodynamic separators provided herein operate in a range of 100/s to 5000/s for the average shear rate, which is sufficiently smaller than that necessary to rupture algae cell walls of any of the foregoing types or bio-organisms and most others. Therefore, the present hydrodynamic separators represent an acceptable alternative to conventional membrane filtration systems with regard to the problems caused by excessive shear.

Further, it is known that Extracellular polysaccharide secretions (EPS) serve as the precursor for the production of transparent exopolymeric particles (TEP), which include the foregoing examples and many other species, and which play a decisive role in macro-aggregation processes. These gel-like particles appear in many forms, including amorphous blobs, clouds, sheets, filaments or clumps, ranging in size from ~2 to ~200 μm. TEP are mostly polysaccharide, negatively charged, very sticky and are frequently colonized by bacteria. These aggregates foul membrane systems and serve as nutrients for bio-film growth.

Conventional filtration at normal operating flow rates, is likely to deform or shred the TEP into smaller fragments, but is unlikely to readily remove the TEP. Thus, it remains as a basis for further growth of the bio-film.

In consideration of the foregoing one aspect of the current application provides a membrane-less hydrodynamic separator, suitable for implementation in an off-shore environment, and in another embodiment a suitable membrane-less hydrodynamic separator is provided for on-shore operation in connection with a further processing of the water. In each situation the appropriate membrane-less hydrodynamic separator is used for treating seawater and/or freshwater to remove bio-organics, i.e. algae, TEP, phytoplankton, diatoms, and other bio-organisms, without using a filtration barrier. Depending on the implementation removed bio-organic material may be returned to the source water or may be disposed of as needed. The membrane-less hydrodynamic separators provided are ecologically friendly in several regards, i.e., they do not require the use of toxic or harmful chemicals or release the same to the environment; they provide for the return of concentrate cleaned from the raw seawater and/or freshwater to the shore for disposal or further treatment, to the intake source for further treatment, or back to the source water; they operate on hydrodynamic force generated by the fluid flow through the separator; and, if necessary, they provide for the use of a biocompatible and biodegradable organic flocculent, such as chitosan, made from the chitan of shells, as a separation enhancer.

Turning to FIG. 1 shown are results on algae (*Dunaliella* sp.) separation from source water using the aforementioned hydrodynamic separator. The source algae concentration was 150 ppm, which is about 3 to 6 times higher than the concentration at which an algae bloom is considered. In a separate experiment it has been shown that the concentration can go as high as 5000 ppm of solids loading in the concentrate stream before the hydrodynamic separation principle starts to fail. From FIG. 1 it can also be seen that the moderate shear stress within the separation channels is not large enough to cause the algae to break up, since the concentrate peak shows the same width and mean size as the source peak, indicating that no fragments of ruptured cells are present. In order to reduce the shear rate in the channel further, a flocculent (e.g. Chitosan or clay) can be used to grow larger aggregates that can be removed with a device that requires a lower pressure head.

Figure 2A:
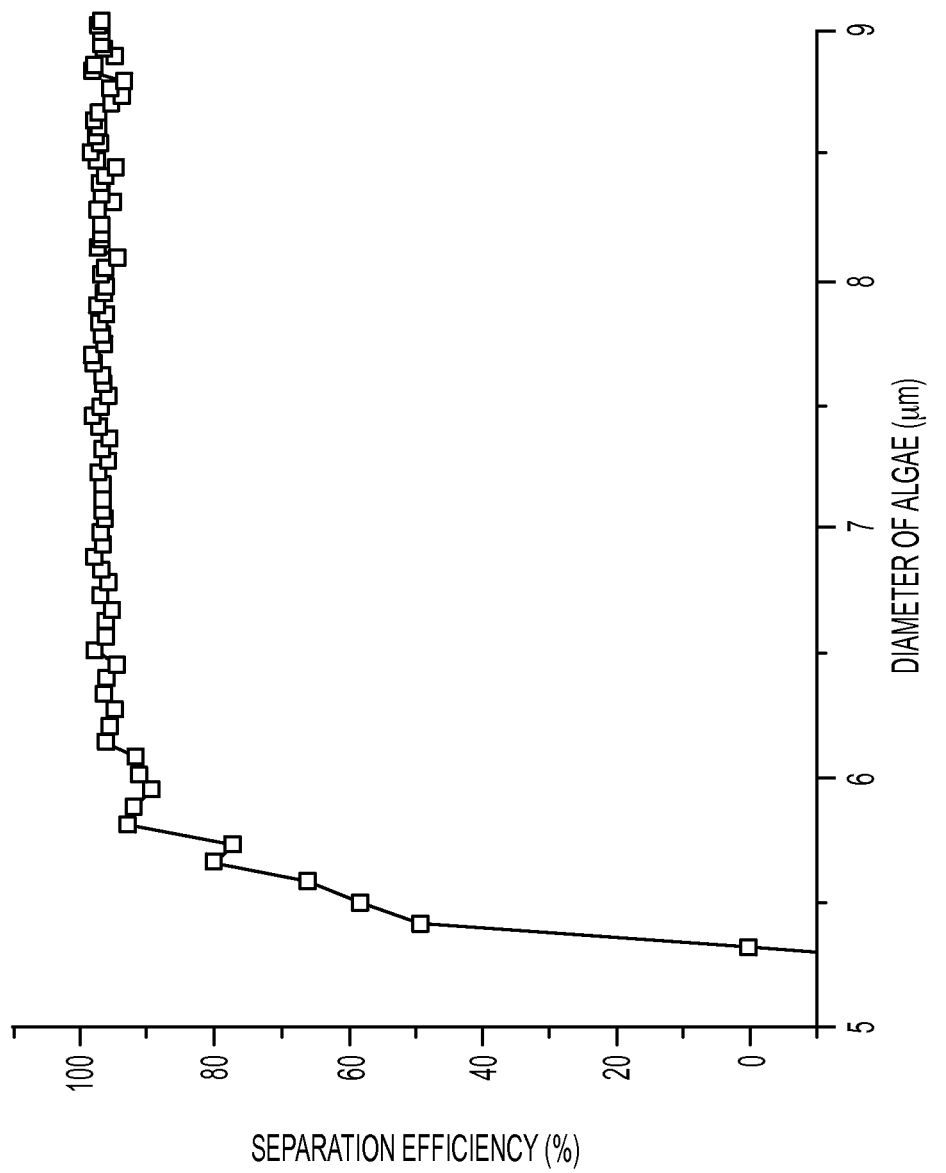
FIG. 2A is a graph showing efficiency of a pretreatment device in a form of the presently described embodiments.

FIG. 2A further details the effectiveness of the current hydrodynamic separation in a graph showing the hydrodynamic separation to operate with 95% efficiency with regard to the removal of algae having a diameter of greater than about 6 μm.

Figure 2B:
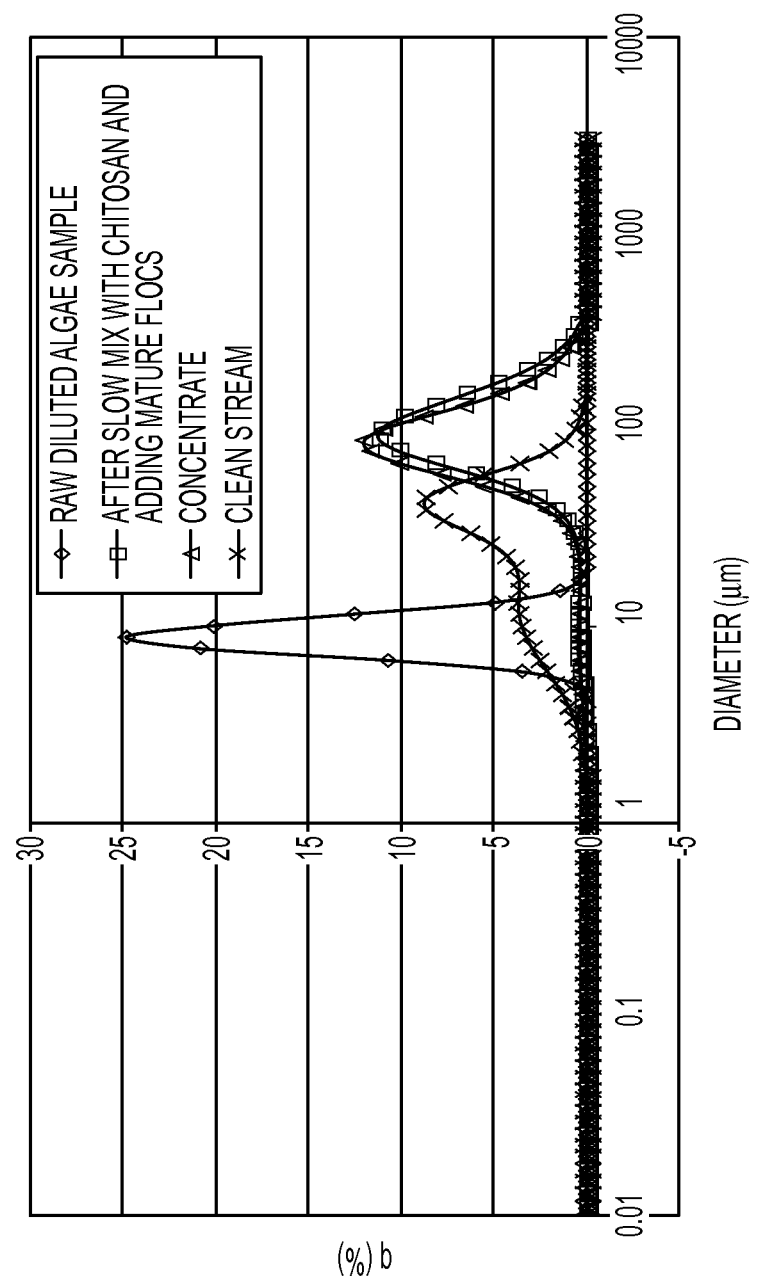
FIG. 2B is a graph showing results for removal of algae using the pretreatment device in a form of another presently described embodiments (includes the flocculation step)

FIG. 2B shows particle size distributions before and after hydrodynamic separation of *S. dimorphus*. This type of algae has been grown into larger aggregates using the biological flocculent chitosan, before hydrodynamic separation. With this approach >94% harvesting efficiency of the algae was achieved, while the algae concentration in the clean stream was reduced by a factor of about 25. Separation results of FIG. 2B were achieved with a floc separator having a high particle size-cutoff, and therefore particles in the 20-40 micron range in the clean stream are to be expected. It is to be understood in other situations a lower particle size-cutoff may be achieved. It is also noted that the curves of FIG. 2B are not normalized, meaning the total amount of solids shown in the clean stream is much less than in the concentrated stream.

Figure 3:
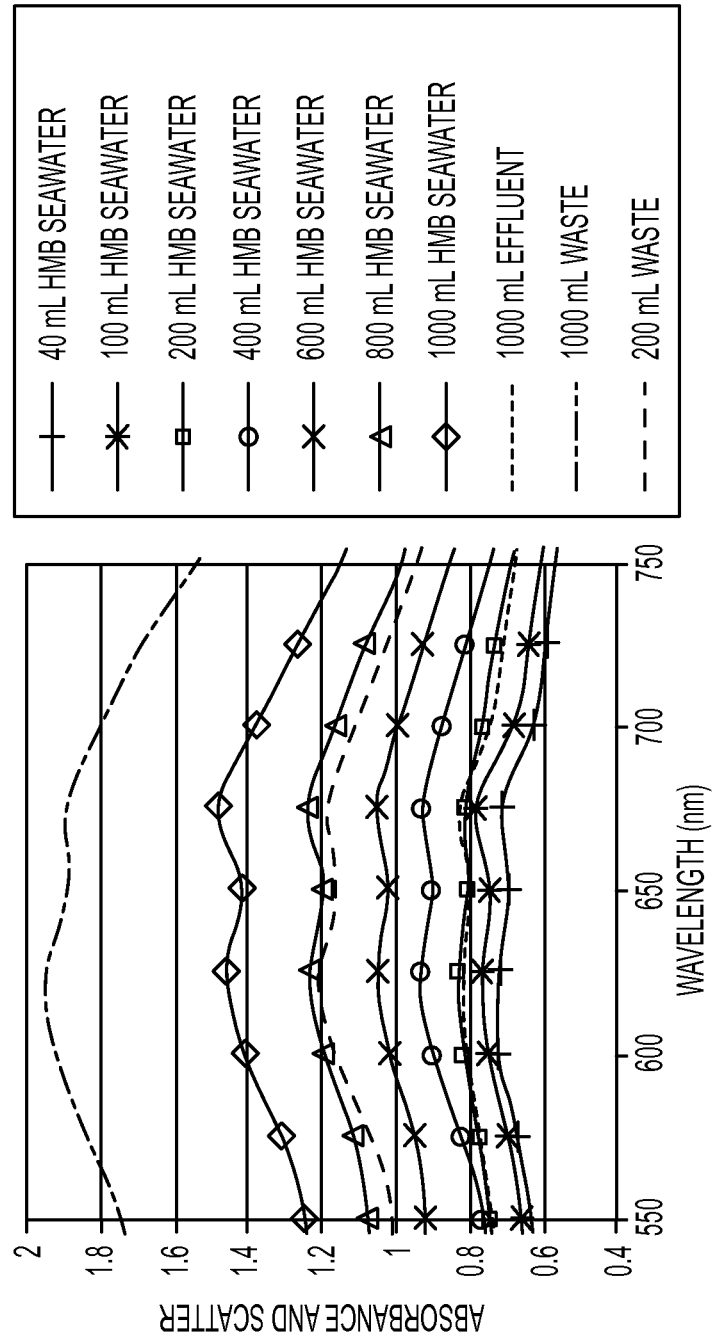
FIG. 3 is a graph of absorbance spectra of different seawater samples with Alcian Blue strained TEP

With attention to TEP removal, it is appreciated that TEP is a wide class of different organic polymers that are excreted and released by organisms, and which can become abundant during the excessive algae growth in a bloom. These biopolymers have wide poly-dispersity and have the ability to form non-covalently-bonded nano, micro, or macrogels depending on pH, crosslinking ion (e.g. calcium) concentration and temperature, and consequently, along with changes in these suspended media conditions, may readily convert between size regimes. To remove these polymers the inventors have used Chitosan as a flocculent to grow aggregates beyond the cut-off size of the hydrodynamic separator. FIG. 3 shows absorbance spectra of TEP staining taken from different amounts of input seawater and equivalent spectra taken from the concentrate and clean streams taken from the hydrodynamic separator. Using the dye Alcian blue, which selectively binds to sulfate and carboxylic groups, it is possible to quantify the amount of TEP in a water sample. The curves corresponding to 40, 100 . . . 1000 mL HMB (seawater from a beach near Half Moon Bay, Calif.) provide a scale for different TEP concentrations. With existing (non-optimized) research prototypes, the hydrodynamic separator has demonstrated 86% efficiency in removal of TEP, which translates to a reduction factor >7.

In the following discussion, in which various embodiments are discussed with respect to the Figures, it is understood that like numbers may be used to refer to like components or portions of the Figures. Further, it is understood that though a certain size or type of device may be shown, unless otherwise stated other similar devices or features may be substituted so long as the intended result is achieved.

Figure 4A:
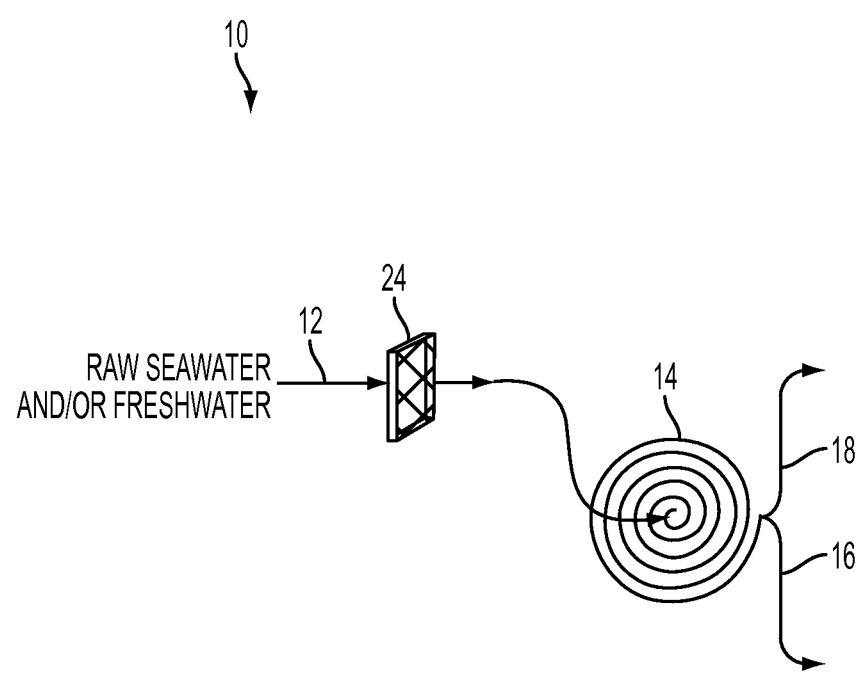
FIG. 4A illustrates a general form of a hydrodynamic separator used in the present concepts.

With reference now to FIG. 4A, a general embodiment of a membrane-less seawater and/or freshwater hydrodynamic separation arrangement 10 is shown. With this type of treatment, particulate matter having a certain particle size or larger is removed by the separator arrangement 10. Shown then is the separator arrangement 10 having a raw fluid (e.g., seawater and/or freshwater) intake 12 passing fluid to a hydrodynamic separation unit 14 as described for example in co-pending, commonly assigned U.S. Published Application No. 2009-0283455, entitled "Fluid Structures For Membrane-less Particle Separation," and naming Lean et al. as inventors. It is to be appreciated that while a spiral separation unit is depicted herein the separation unit 14 may be configured in other designs (i.e., the previously mentioned 180 and 360 degree designs, and designs described in the above cited US patent application and those incorporated herein by reference in their entirety). As will be understood, hydrodynamic separation unit 14 includes a bifurcated outlet (not shown) having a clean stream output line 16 and a concentrate stream output line 18, laden with removed particulate matter. It is to be appreciated the hydrodynamic separation unit 14 shown in the drawings is to be considered a single unit and/or an arrangement including a plurality of such units in the associated discussions.

In this separation arrangement 10, an optional pre-treatment process configuration 24 may be employed, where in one embodiment, the process configuration is a filter such as an 80 mesh screen filter, though any suitable screen filter or other known process which removes particles that exceed the smallest dimension of the separator channels is contemplated as part hereof.

Figure 4B:
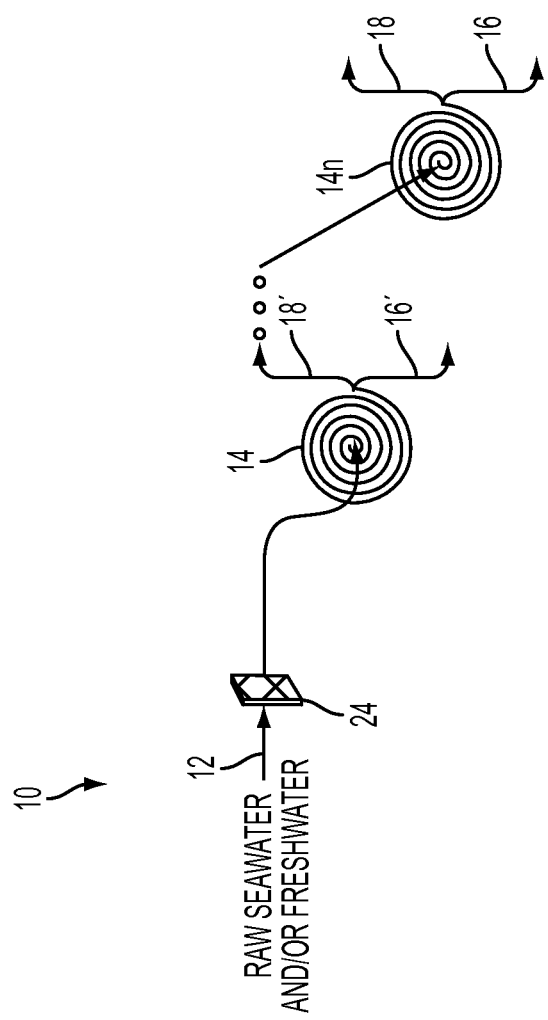
FIG. 4B illustrates the general form similar to FIG. 4A, but having multiple stages of hydrodynamic separator units.

As illustrated in FIG. 4B, it is also understood that the separation arrangement 10 can include multiple hydrodynamic separation units (e.g., 14, 14n) arranged in a multi-stage system, where the concentrate stream 18' of an upstream unit 14 feeds into an inlet of a downstream unit 14n, while the clean streams 16, 16' of all stages are combined.

Figure 5:
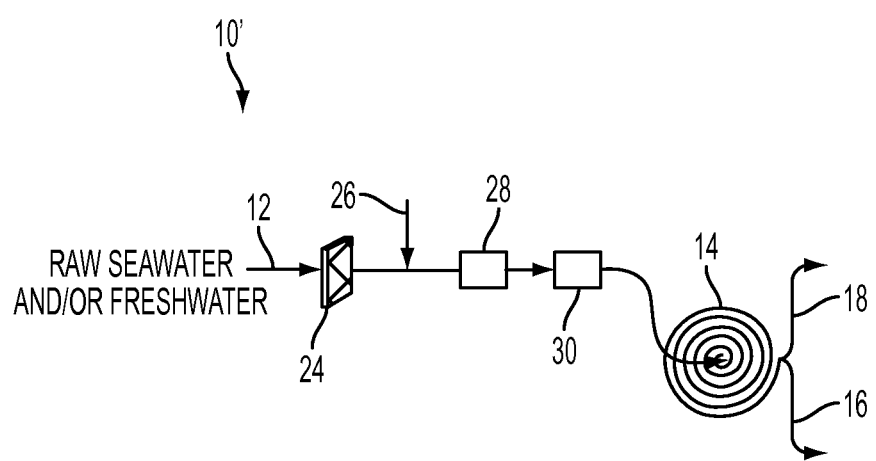
FIG. 5 illustrates a general form of a hydrodynamic separator that uses a coagulant and/or flocculent used in the present concepts.

FIG. 5 provides another general embodiment of membrane-less seawater and/or freshwater hydrodynamic separation arrangement 10' to treat raw seawater and/or freshwater, including water inlet 12 through pre-treatment process configuration 24, hydrodynamic separation unit 14, and then through either clean stream output line 16 or through concentrate stream output line 18. In addition, in this embodiment there is provided coagulant and/or flocculent injection device 26, mixer 28 (e.g., in one embodiment a spiral mixer) to facilitate aggregation of the coagulant and/or flocculent and particulate matter remaining in the rough filtered seawater and/or freshwater, and aggregation tank 30 where the coagulated particulate matter is further combined with a flocculating agent. The addition of these latter units is intended to aid in removal of particulate matter by creating larger particles that are more easily removed by hydrodynamic separation unit 14, where the water from the aggregation tank 30 is passed through the hydrodynamic separation unit 14.

Similar to the discussion of FIG. 4B, the arrangement 10' of FIG. 5 may also employ multiple hydrodynamic separation units (e.g., see 14 . . . 14n of FIG. 4B). It is understood that the design of hydrodynamic separation units shown in FIGS. 4A, 4B and 5 are only for illustration purposes and other separation unit designs (such as but not limited to those shown in FIGS. 13, 14, 17 and 18 may also be used).

Figure 6:
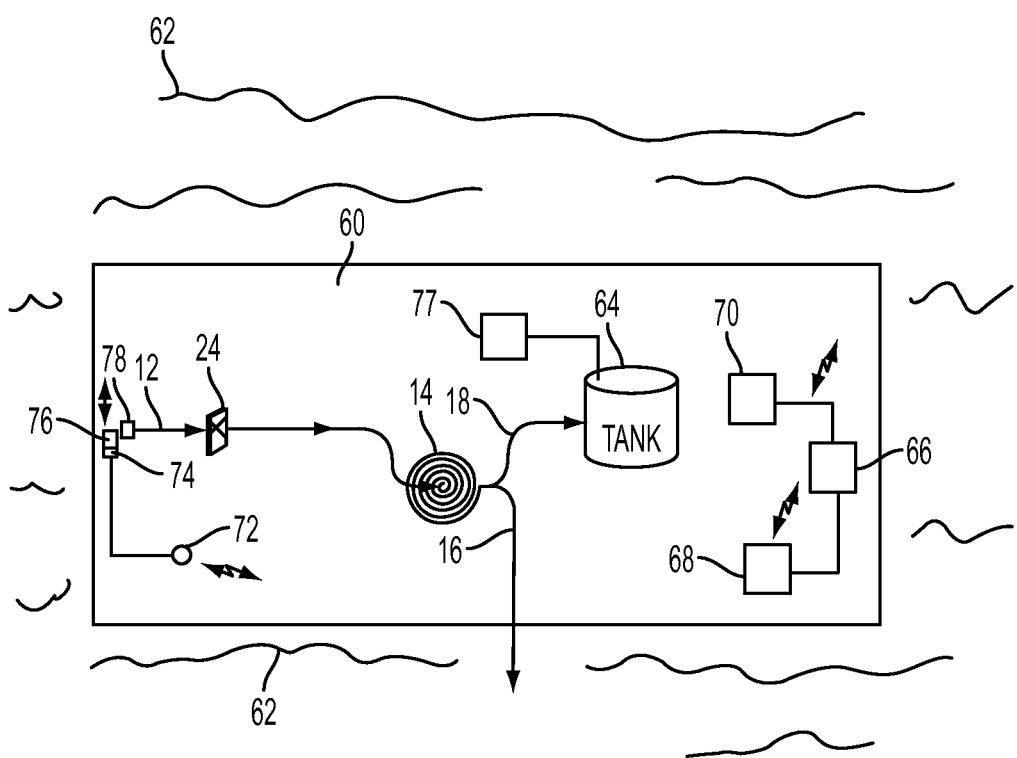
FIG. 6 illustrates a mobile hydrodynamic separator configuration (device) according to the present concepts.

Turning to FIG. 6, illustrated is a mobile hydrodynamic separator system (device) 60 according to the present application, which incorporates the hydrodynamic separation arrangement 10 as shown in FIG. 4A. Use of configuration 10 of FIG. 4A is employed for convenience of this discussion and it is to be understood the multi hydrodynamic separator design (e.g., see units 14 . . . 14n) as shown in FIG. 4B may also be employed herein). More particularly, mobile system (device) 60 includes intake 12, pre-treatment process configuration (e.g., filter mesh screen) 24, fluidic hydrodynamic separation unit 14 having clean stream output line 16 and concentrate stream output line 18, where the output of the clean stream output line 16 is provided back to source water 62, and the output of the concentrate stream output line 18 is provided to a retention storage tank 64. Additionally, mobile system (device) 60 includes a power source 66, where the power source may be provided either by a fuel engine, a battery, solar panel, a wind turbine, other power source and/or a combination thereof, to make mobile system (device) 60 as independent from consumables and weather conditions as possible. The power source 66 is in operational connection with an engine/steering unit 68, which allows the mobile system (device) 60 to independently move from location to location. Also shown as part of mobile unit 60 is a GPS or other navigation system 70, in operational connection with the steering unit 68, where signals from the navigation system 70 to the engine/steering unit 68 are used to control movement of the mobile system (device) 60 as appropriate.

Optionally provided is a sensor 72, such as an optical sensor, used to detect the presence or absence of large algae concentrations (i.e., HABs). For example the optical sensor would be tuned to certain color spectrums that allow the sensor to differentiate between clear water (i.e., no blooms present) and bloom infested water. When it is sensed that the mobile system (device) 60 is in non-bloom infested water, a signal is triggered and received by an inlet controller 74, which is then activated to shutoff the inlet (e.g., an inlet door 76 is closed over the inlet opening 78). This is done to stop non-HABs infested water from being processed. This is beneficial, as at least a portion of this clean water would end up being deposited and stored in the retention storage tank 64, and there would be less room available when the mobile system (device) 60 did encounter water having HABs.

When, however, the sensor 72 senses the mobile (device) 60 is within bloom infested water the sensor 72 re-signals the inlet controller 74, and the controller opens the inlet door 76, allowing water to be received into the inlet opening 78 for processing. The inlet controller 74 is tuned to certain trigger points wherein a signal to open the inlet opening occurs only when a certain level of detection is reached for a certain time period (e.g., to avoid false positive readings). This of course is only one example of how this sensor arrangement may be tuned, as different environments will call for different operation. It is also appreciated the use of a sensor to control the opening and closing of the inlet door 76 is optionally available for use in TEPs environments.

This sensor could be mounted either at the outside of the mobile unit, monitoring the source fluid directly, or it can be mounted inside, either directly on the fluid intake for the separator on a separate intake pipe.

Additionally, it is to be understood that the sensor 72 may be other than an optical sensor, capable of distinguishing between HAB infested water and clean water. Also, rather than relying on an onboard sensor the mobile system (device) 60, is alternatively designed such that a signal from an external source may be provided to the inlet controller 74. This signal may for example come from a person on-shore or on a ship observing the location of the mobile system (device) 60 and the HAB (and/or TEP) outbreak, such as by a satellite feed. Similarly, while the steering of mobile system (device) 60 has been described as undertaken via signals obtained onboard the mobile system (device) 60 (i.e., signals from the navigation 70), the navigation and steering of the mobile unit 60 may alternatively be accomplished remotely, i.e., again by a person who is onshore or on a ship and relaying the signals to the engine/steering unit 68. In both of these scenarios the inlet controller 72 and engine/steering unit 68 are designed to include appropriate receiver/transmitter units.

In operation, source water 62 is moved into inlet 12 (e.g., via opening 78), where larger particles are filtered via filter 24. Then, similar to the process in FIGS. 4A and 4B, separation of water and algae or other harmful bio-solids is achieved in hydrodynamic separation unit 14 (or units 14 . . . 14n, see FIG. 4B). The clean water is then output via output line 16 back to source water 62. The concentrated bio-solids (e.g., algae) are moved into retention storage tank 64.

While a single hydrodynamic separation unit 14 is shown, it is to be understood that, depending on the concentration of the HAB and the source water 62, multiple stages of hydrodynamic separation unit 14 may be used in series to further concentrate the algae to a highest solid fraction as possible before collecting inside tank 64.

An additional optional feature is a disinfection module 77, positioned to interact with the bio-organics located within tank 64. In certain embodiments, the disinfection module 77 employs ultraviolet light, ozone, ultrasound, and/or chemicals, among other items, to disinfect or kill the collected bio-organics of the HABs. In yet another embodiment, the disinfection module 77 may be in the form of a mechanical device used to kill the bio-organics, for example, the mechanical embodiment may include a rotating blade, or crushing arrangement, among other configurations.

Figure 7:
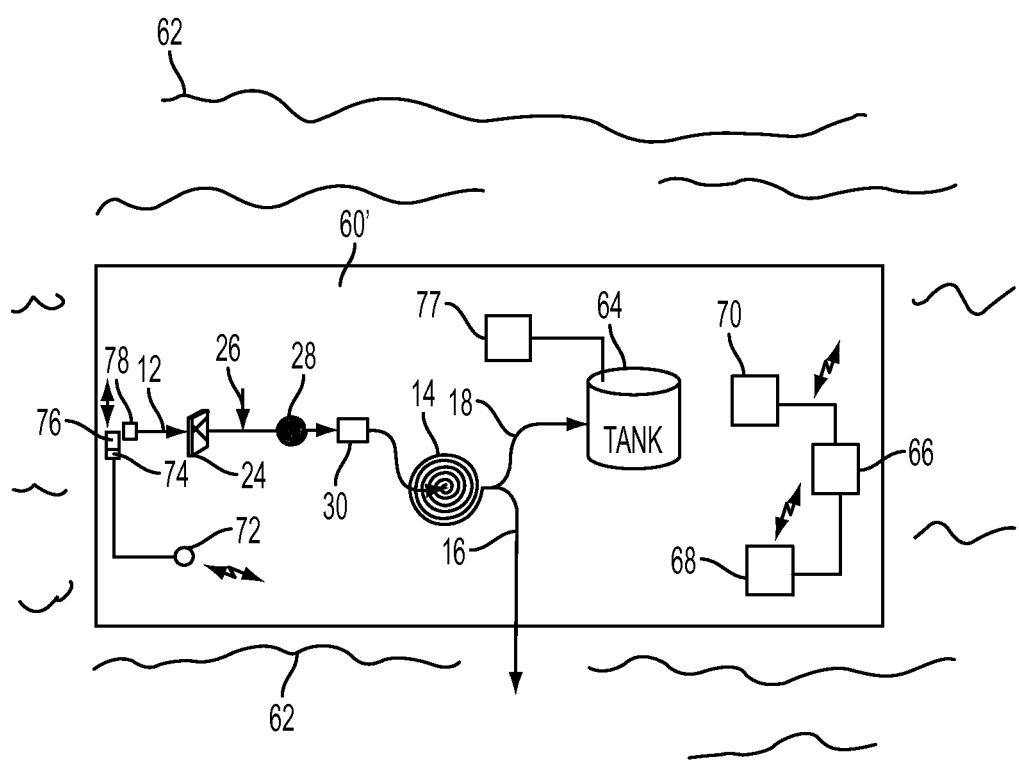
FIG. 7 illustrates another mobile hydrodynamic separator configuration (device) according to the present concepts.

Turning to FIG. 7, depicted is another embodiment of a mobile system (device) 60' according to the present application, including elements as described in FIG. 6. In addition, in this embodiment, a flocculent dosing system (26, 28, 30) is implemented between the pre-treatment process configuration 24 and a first separator unit 14 in order to allow the removal of smaller particulates (e.g., algae and TEP). In particular as described in FIG. 5, this embodiment provides coagulant and/or flocculent injection device 26, mixer 28 to facilitate aggregation of the coagulant and/or flocculent and particulate matter remaining in the rough filtered seawater and/or freshwater, and the aggregation tank 30 where the coagulated particulate matter is further combined with a flocculating agent. The addition of these latter units is intended to aid in removal of particulate matter by creating larger particles that are more easily removed by hydrodynamic separation unit 14. With attention to the other components of mobile system (device) 60', their configuration and operation are as described in FIG. 6 (including optionally multiple hydrodynamic separation units (e.g., see 14 . . . 14n of FIG. 4B).

Figure 8:
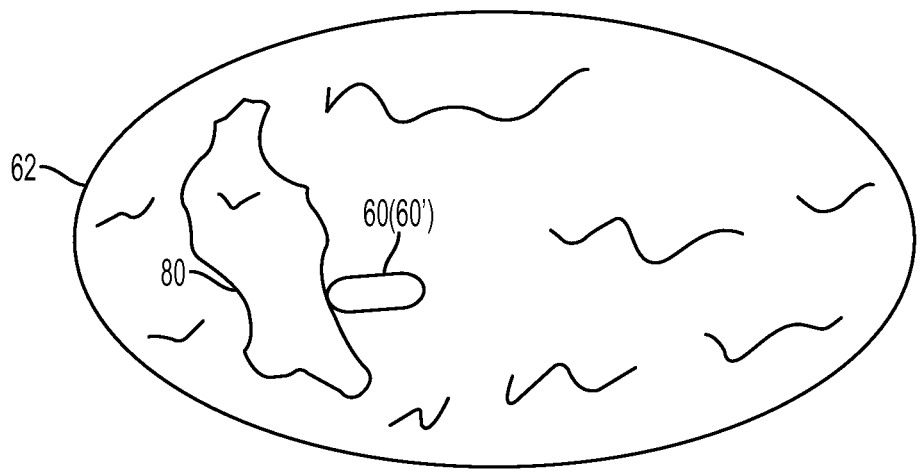
FIG. 8 is a top view of a mobile hydrodynamic separator configuration (device) on a body of water containing HAB.

Turning to FIG. 8 shown is a top view depicting the mobile system (device) 60 (60') within a body of water 62, and within an algae bloom (HAB) 80. FIG. 8 shows that mobile system (device) 60 (60') has the ability to operate (i.e., remove algae) in areas that are not on-shore. In other words, it has the flexibility to go to the HABs rather than being restricted to waiting for the HABs to come into its location.

Figure 9:
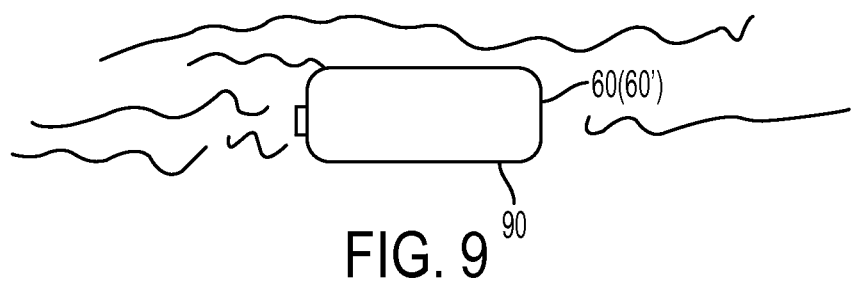
FIG. 9 is a side view of the mobile hydrodynamic separator configuration (device) operating in a submerged manner.

It is to be appreciated the components of mobile system (device) 60 (60') are configured to operate in a water environment, therefore all proper sealing and coverings are provided as needed to allow proper operation. In that regard, attention is directed to the side view of FIG. 9 where the mobile system (device) 60 (60') is shown operating in a submerged manner. In other words the mobile unit in this embodiment is constructed using known waterproofing techniques so its entire body 90 is below the surface of the water 62. In this scenario water is input to the mobile device via the intake 12 by operation of wave action and/or due to the movement of the mobile device. It is understood in other embodiments intake of the water may also be controlled by an input pump to ensure a steady predetermined amount of water intake. It is to be understood the body 90 of the mobile system (device) 60 (60') acts to allow proper operation of the elements of the mobile device. In other words the body 90 (in addition to other sealing and coverings) operates to ensure that the components, elements of the mobile device are not flooded by the water 62.

Figure 10:
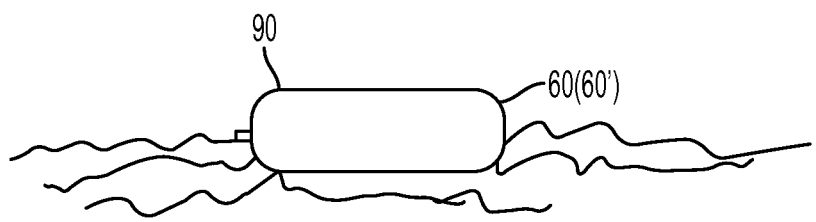
FIG. 10 is a side view of the mobile hydrodynamic separator configuration (device) operating in a swimming mode.

FIG. 10 is a side view of the mobile system (device) 60 (60') operating in a swimming mode. In this design a portion of the mobile system (device) 60 (60') is above the surface of the water. The intake of the water is accomplished by operation of wave action and/or due to the movement of the mobile device. It is understood in other embodiments intake of the water may also be controlled by an input pump to ensure a steady predetermined amount of water intake. Similar to the discussion of FIG. 9, the body 90 also acts to ensure that the components, elements of the mobile device are not flooded by the water.

It is to be appreciated that the GPS system can be used in different ways including to steer the mobile device on a pre-programmed operator defined path, or it may provide a random path within bloom 80, as well as redirecting the path of the mobile system (device) 60 (60') to a specific location on demand.

Figure 11:
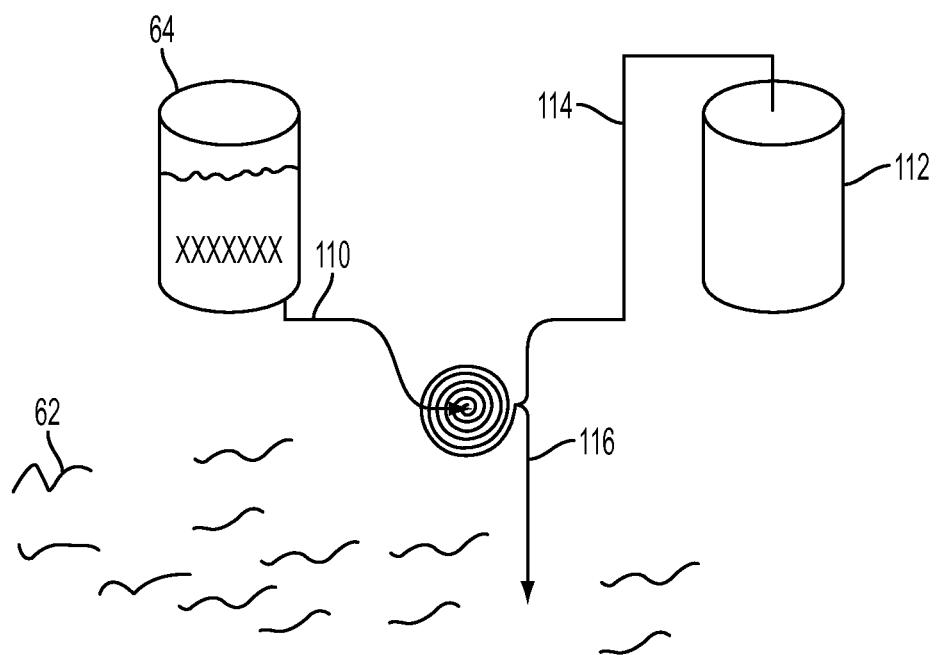
FIG. 11 depicts an alternative operation of the containment tanks.

Turning to FIG. 11, in another embodiment, in order to provide further concentration, coagulation is provided to tank 64 to further concentrate the algae. The water with the further concentrated algae within tank 64 is provided to another hydrodynamic separator unit 14 via tank outlet line 110. Hydrodynamic separator unit 14 further concentrates the algae into an algae stream that is provided to tank 112 via outlet line 114. Water which has been further separated from the algae is provided via an outlet line 116 back to the water source 62.

Figure 12:
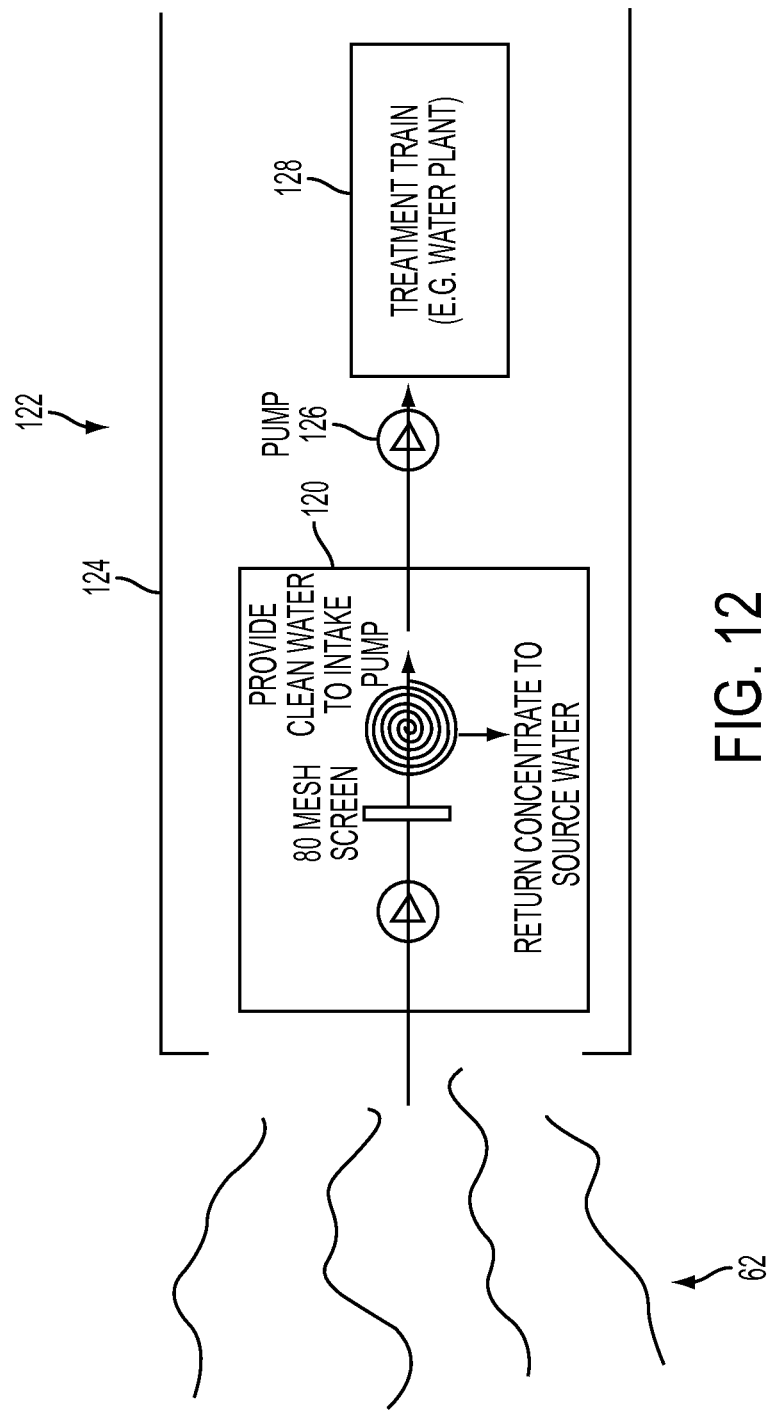
FIG. 12 is a diagram of an intake algae removal unit capable of operating in conjunction with a seawater or freshwater treatment plant.

The mobile systems (devices) illustrated in the foregoing embodiments were shown to be off-shore. However, it is to be appreciated that, as shown in FIG. 12, the present concepts may be used in embodiments for use as a pre-processing unit 120 (and with arrangements such as the configurations shown in FIGS. 4A, 4B and 5) in a treatment train 122 that provides algae-free water for downstream processing such as intake pipes in a desalination system or cleaning fresh water in city systems for example. This pre-processing unit 120 is part of the embedded intake structure 124 to clean the water before it is pumped (e.g., via pump 126) to the actual water plant portion 128 of the treatment train. In this case the concentrate stream can be re-circulated directly into the source water (preferably at a location where the now concentrated algae do not immediately come back to the intake) 62. Alternatively, the concentrated algae can be collected in a separate location for further processing. In this case a multi-stage hydrodynamic separator unit arrangement may be beneficial to increase the algae concentration as much as possible. A flocculent dosing system located between the pre-processing configuration 120 and a first separator unit may also be used in order to allow the removal of smaller algae and TEP. This stationary unit may be most beneficial in waters (e.g. (coastal areas of) oceans, fresh water lakes, rivers, etc.) which are prone to seasonal or human-induced HABs.

Figure 13:
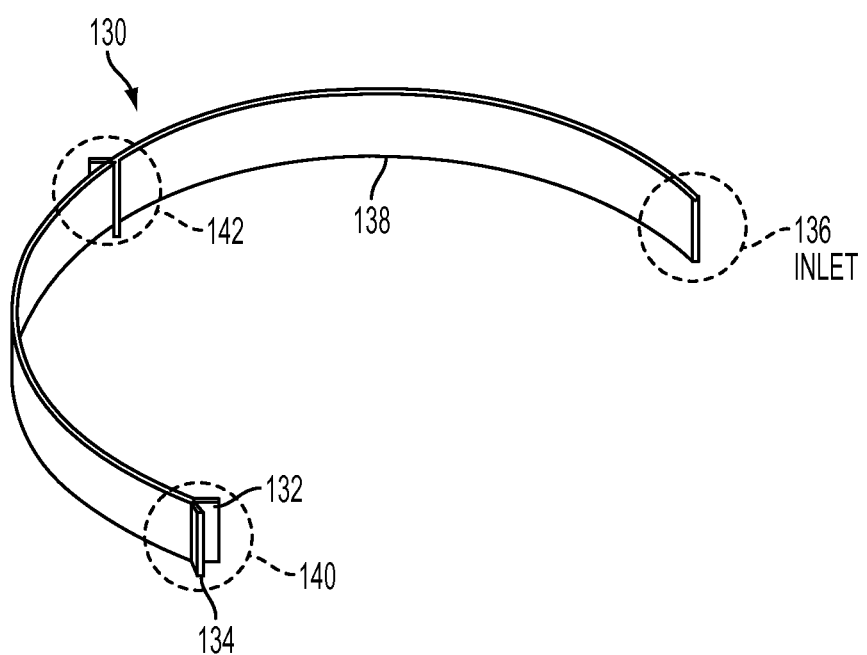
FIG. 13 is a representation of a single curved channel hydrodynamic separator.

The membrane-less hydrodynamic separator units 14 as shown herein may take the form of any hydrodynamic separator disclosed in those disclosures to our common assignee incorporated herein by reference. For example, though not intended to be in any way limiting, FIG. 13 provides a representation of an example hydrodynamic separator unit suitable for use herein. This figure is also set forth as FIG. 5 of co-pending, commonly assigned U.S. Published Application No. 2009-0283455, entitled "Fluid Structures For Membrane-less Particle Separation," and is further explained therein. FIG. 13, then, sets forth an example of a suitable hydrodynamic separator unit 130, in keeping with the definition provided above, having an inlet 136 (which may include an inlet coupler for stacked arrangements), curved portion 138, and at least one bifurcated outlet 140 defining a clean stream 132 and a concentrate stream 134. As shown, there may be provided an additional outlet 142 for selected particles such as particles of a particular size or density (e.g. buoyant particles). The outlet 142 is positioned at a location around the curve portion 138 between inlet 136 and outlet 140, while FIG. 13 shows the outlet midway, the outlet can be anywhere between the inlet and the outlet. As above, at least one outlet coupler may also be utilized. Depending on the seawater or freshwater quality, i.e., particulate concentration and size distribution, hydrodynamic separator unit 130 will collect the particulates into a band of different widths. In order to allow optimization of the efficiency of the hydrodynamic separator unit in real time, it is desirable to have an adjustable stream splitter (not shown). It is understood that hydrodynamic separator unit 130, as shown in this FIG. 13 may be a single unit (which may be understood to be a module) or a plurality of parallel stacked units (or modules), as shown in more detail in FIG. 14.

Figure 14:
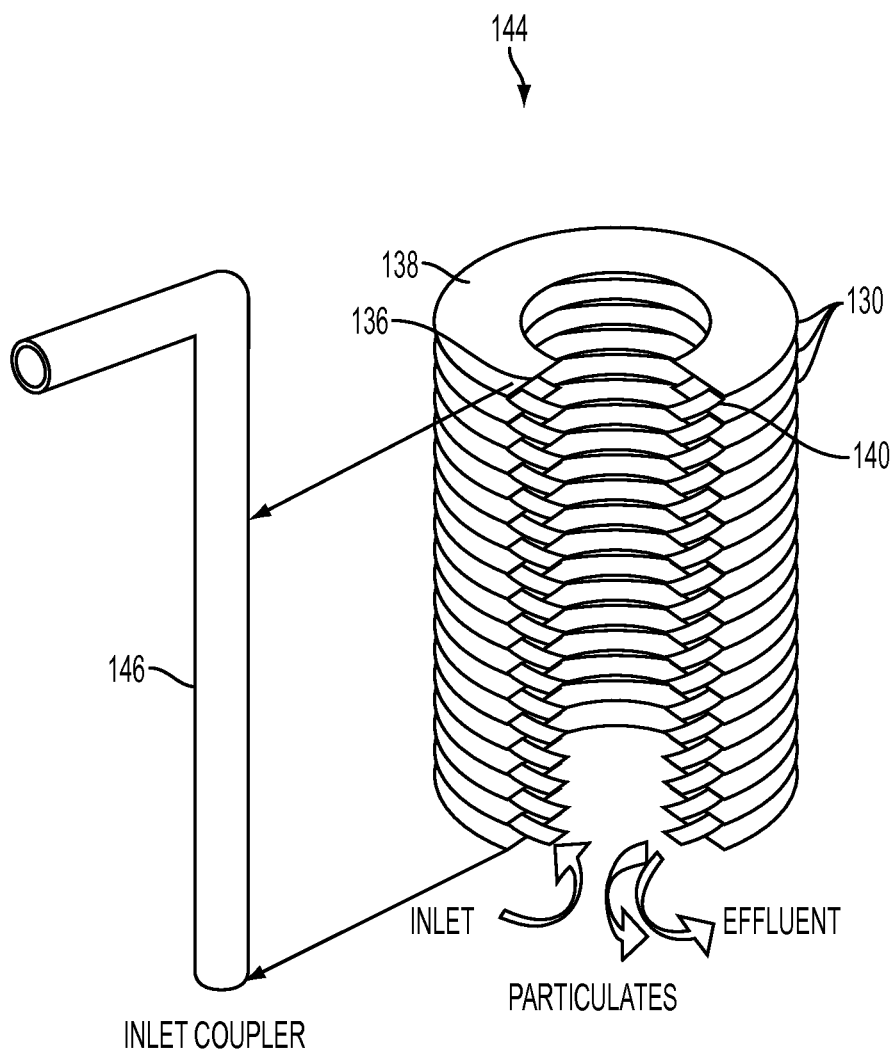
FIG. 14 is a representation of a stacked arrangement of a plurality of curved channel hydrodynamic separators.

FIG. 14 provides a representation of a stacked arrangement including a plurality of hydrodynamic separator units 144, for example of the type shown in FIG. 13 (i.e., 130). This stack of hydrodynamic separator units 144 (e.g. fractional arc segments) is vertically stacked as parallel channels to increase throughput. These hydrodynamic separator units do not complete a loop for any one unit of the plurality of units 144, although the characteristics and functions of a spiral device will nonetheless apply to these stacked separator units in this case. The hydrodynamic separator units 144 each comprise an inlet 136, curved or arc section 138 and an outlet 140. Also shown in FIG. 14 is an inlet coupler 146 that allows for an inlet of seawater and/or freshwater from a common source to each hydrodynamic separator unit 144 shown. It should be appreciated that the inlet coupler may take a variety of forms. In one form, the inlet coupler is a cylinder and has perforations or a continuous slot corresponding to the inlet of each hydrodynamic separator. At least one outlet coupler (not shown) may also be implemented. The outlet coupler(s) could resemble the inlet coupler, for example.

Figure 15:
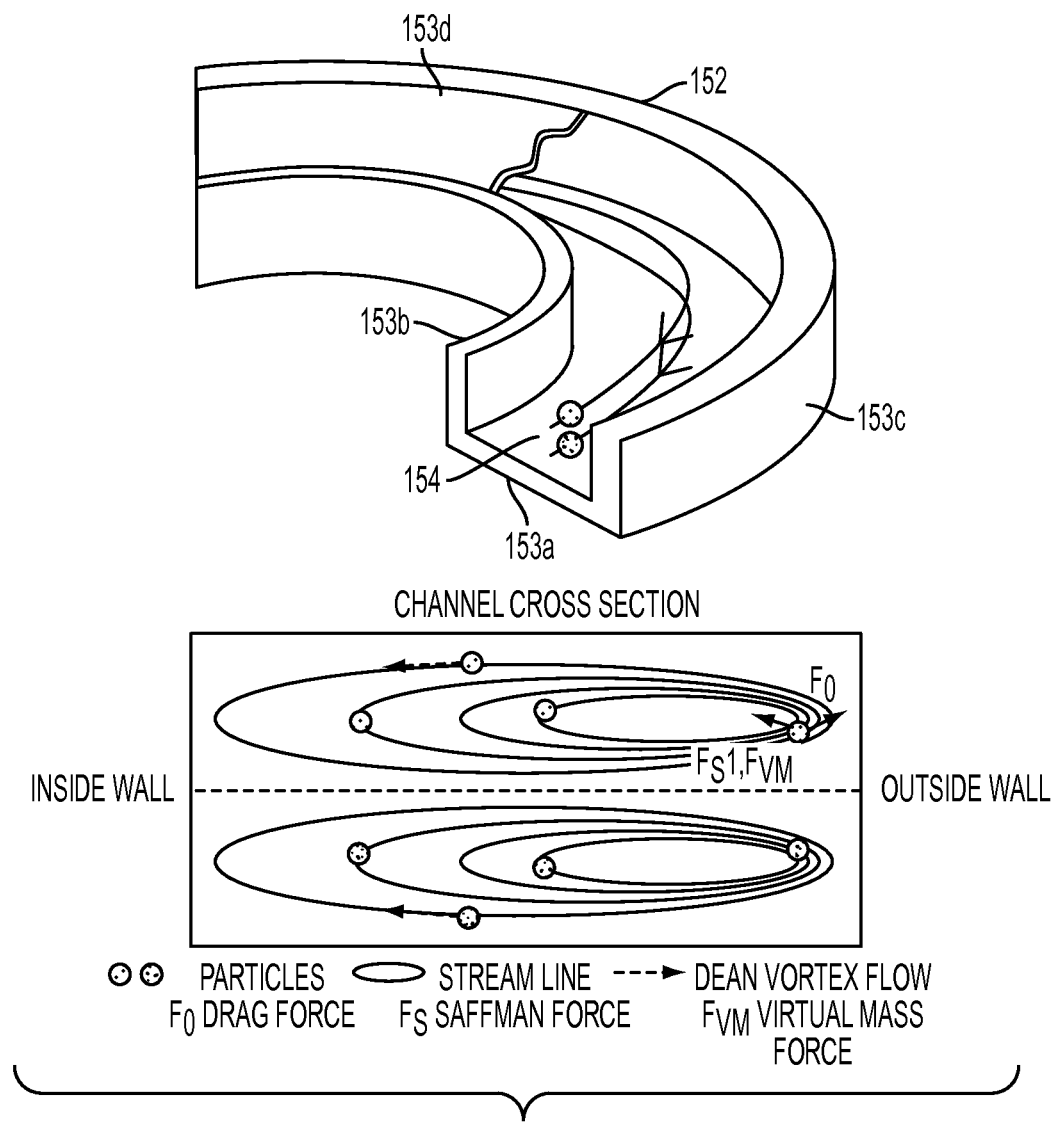
FIG. 15 is a representation of a particle flowing through a channel and forces acting thereon.

Turning now more particularly to the separation concepts of the hydrodynamic separation units in the foregoing discussion, FIG. 15 illustrates a curved channel 152 which is to be found in such hydrodynamic separation units discussed in the present application, including those illustrated in FIGS. 4A-7, 12, 13, 14, 16 and 17, as well as those depicted in the documents incorporated herein by reference. It is to be appreciated that in embodiments of these difficultly configured separation units, the curved channel incudes a bottom wall 153a, an inner side wall 153b, an outer side wall 153c and a top wall 153d, where a portion of top wall 153d is shown as removed for discussion purposes. By this design with the top wall 153d, the fluid passing through the channel 152 is maintained securely within the channel.

With continuing attention to FIG. 15, it is shown that centrifugal forces acting on the liquid stream introduce a transverse flow pattern, which can manifest as a pair of Dean Vortices. Under the right flow conditions a combination of hydrodynamic forces (drag, shear, inertia) move suspended particles to an equilibrium position near one of the side walls. This separation mechanism is to first order independent of the density of the particles, allowing the concentration of neutrally buoyant particles 154 (e.g., particles such as algae having substantially the same density as water, or the fluid in which the particles reside) flowing in a fluid, e.g. water, to facilitate improved separation of such particles from the fluid into a concentrated mass. All the forces acting on the particles are dependent on the size of the particle, and only particles exceeding a certain cut-off size will be concentrated. The smaller a cut-off size is desired, the higher is the required pressure head. For example, hydrodynamic separator with a 20 micron particle size cut-off can be realized with about 20 psi pressure head. If the suspended particles that need removal are very small, it is desirable to grow them into larger entities before attempting a hydrodynamic separation. By controlling the size of particulates that will be concentrated, it is possible to allow smaller algae, for example, that are not detrimental to the environment, to be returned, in fact, back into the water.

Depending on the channel geometry and the flow rate the particles are concentrated either at the inner or the outer side wall.

Figure 16:
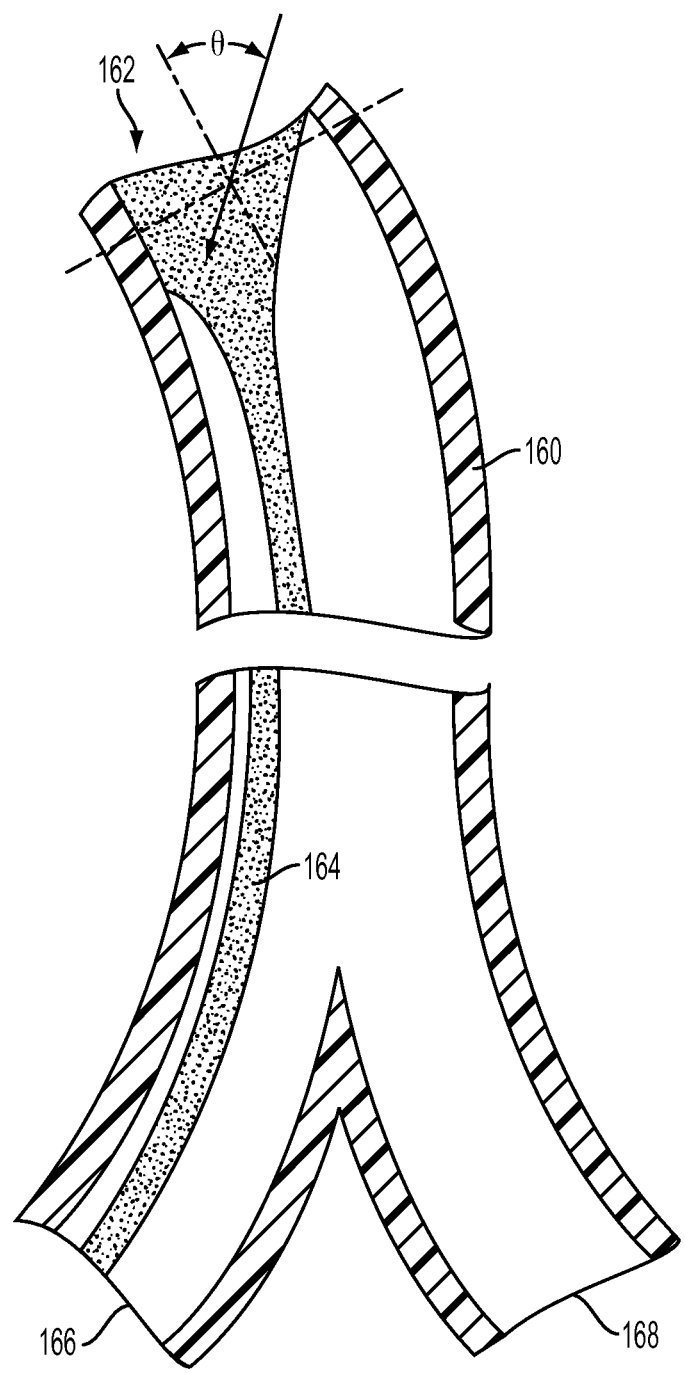
FIG. 16 illustrates the particle band formation in the curved channel created by various forces.

As shown in FIG. 16 angled impingement of the inlet stream towards the inner wall also allow for earlier band formation due to a Coanda effect where wall friction is used to attach the impinging flow. With continuing reference to FIG. 16, the channel 160 has an inlet 162 wherein the inlet stream is angled toward the inner wall by an angle .theta. The concentrated particle band 164 is thus formed earlier for egress out of the outlet 166. Of course, the second outlet 168 for the remaining fluid in which the band 164 does not flow is also shown. It should be understood that the inlet angle may be realized using any suitable mechanism or technique.

The hydrodynamic separator units employed herein are compact, have no moving parts, are flow through, have no physical barriers, require low energy, will not lyze algae, will remove TEP, has low fouling potential, and may be used with or without flocculants. The separators are of a modular construction, are inexpensive in both materials and fabrication cost and are highly scalable for the desired throughput.

Figure 17:
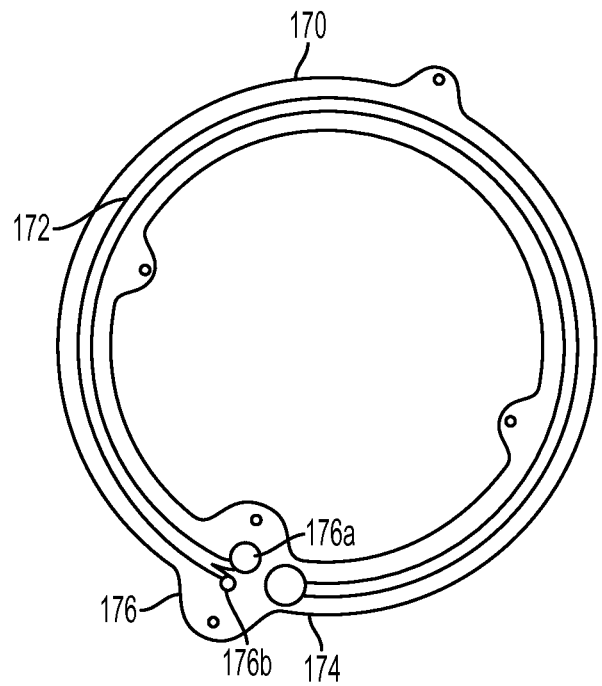
FIG. 17 shows an embodiment of a hydrodynamic separator in accordance with the present concepts.

Turning to FIG. 17, illustrated is another embodiment of a hydrodynamic separator unit 170 to be employed in the embodiments of the present application. Hydrodynamic separator unit 170 includes a substantially full-turn type arrangement, wherein channel 172 starting at inlet 174 encompasses a 350° turn to outlet end 176. Similar to previously discussed separators, the outlets 176 are bifurcated, including outlets 176a and 176b, wherein depending upon the pressures achieved, as previously discussed, for example in connection with FIGS. 15 and 16, a concentrated stream will exit at one of the outlets, and a clean water stream will appear at the other outlet.

Figure 18:
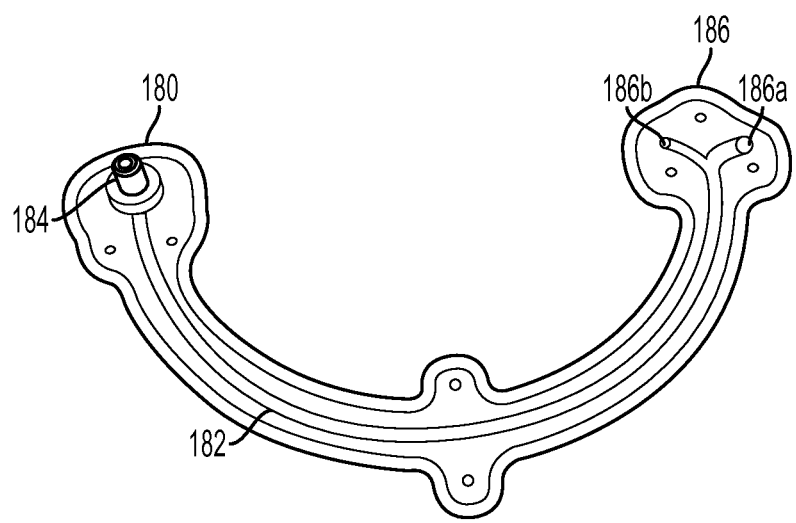
FIG. 18 illustrates an embodiment of a hydrodynamic separator in accordance with the present concepts.

Turning to FIG. 18, depicted is another embodiment of a hydrodynamic separator unit 180 to be employed in the concepts of the present application. Hydrodynamic separator unit 180 is a 180° separator unit, wherein channel 182 traverses a 180° arc from inlet 184 to outlets 186. As discussed in the previous hydrodynamic separator embodiments, outlet end 186 includes outlets 186a and 186b, wherein depending again upon the forces employed, will result in a concentrated stream out of one of the outlets, and a clean water stream in the other.

More explicitly, the general hydrodynamic separator representations illustrated in the previous figures may be substituted with the hydrodynamic separator units 170 and 180 of FIGS. 17 and 18. For example, in the system of FIG. 4A, the hydrodynamic separator unit 170 of FIG. 17 may be used in place of hydrodynamic separator unit 14, by having the inlet 174 connected to receive output via filter 24 of FIG. 4A. Regarding FIG. 18, such substitution would be achieved by having inlet 184 connected to receive the output from the filter 24. Similar connections would be made throughout the other foregoing embodiments, such as but not limited to those shown in FIGS. 6, 7 and 12.

It is understood that, whereas FIGS. 17 and 18 illustrate curved hydrodynamic units with spans of 180° and 350°, such hydrodynamic units may be of a range incorporating these stated values, including from approximately 45° to 360° (such as but not limited to 45°, 90°, 135°, 225°, 275°, 300°, etc.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A harmful algae bloom (HAB) and/or transparent exopolymer particle (TEP) mitigation device comprising:
    a mobile body which moves within or upon a body of water;
    a hydrodynamic separation system located on the mobile body, wherein the hydrodynamic separation system includes a source water inlet for inputting water from the body of water within or upon which the mobile body is located, a hydrodynamic separation unit arranged to receive the water from the source water inlet, and a collection tank, wherein the hydrodynamic separation unit includes bi-furcated outputs, a first output being a clean stream output line containing clean water and arranged to re-circulate the clean water back into the body of water, and a second output being a concentrate stream output line, the concentrate stream output line configured to place concentrate water containing harmful bio-organics found in at least one of HAB and TEP infested waters into the collection tank;
    the hydrodynamic separation system further including a plurality of curved hydrodynamic separation units which span approximately between 180 degrees and 360 degrees in a stacked configuration and an inlet of a first hydrodynamic separation unit is operatively connected to the source water inlet;
    a HAB and/or TEP sensor configured to detect the presence or absence of HAB and/or TEP infested waters;
    a source water inlet door or cover configured to cover and uncover the source water inlet, and positioned in relationship to the source water inlet wherein when the door or cover is positioned to cover the source water inlet, water is stopped from entering the system and from being processed and from being provided to the collection tank;
    a source water inlet door or cover controller configured to receive a signal from the HAB and/or TEP sensor, wherein the source water inlet door or cover controller acts to close the source water inlet door or cover over the source water inlet when the HAB and/or TEP sensor senses the absence of HAB and/or TEP infested waters and the source water inlet door or cover controller acts to open the source water inlet door or cover when the HAB and/or TEP sensor senses the presence of HAB and/or TEP infested waters;
    a power source located on the mobile body; and
    an engine/steering unit, the engine/steering unit in operative connection to the power source to receive power to motivate movement of the mobile body, and wherein the steering portion of the engine/steering unit provides a capacity to move the mobile body in an intended direction.

2. The mitigation device of claim 1 further including a navigation unit to control movement of the mitigation device.

3. The mitigation device of claim 1 wherein the sensor is an optical sensor.

4. The mitigation device of claim 1 wherein the power source includes at least one of a fuel, a battery, a solar based power supply, a wind turbine.

5. The mitigation device of claim 1 further including a second collection tank in operative connection with the collection tank, wherein the bio-organics are concentrated in the collection tank and then the concentrated bio-organics are provided to the second collection tank.

6. The mitigation device of claim 1, the mitigation device further configured with waterproofing wherein the mobile device is configured to operate submerged below the surface of the water.

7. The mitigation device of claim 1 wherein at least a portion of the mitigation device is above the surface of the water.

8. The mitigation device of claim 1 further including a flocculent dosing system which is implemented between the inlet and the hydrodynamic separation unit and wherein the hydrodynamic separation unit is configured to operate with approximately a 94% efficiency for algae having a diameter of greater than 6 μm.

9. The mitigation device of claim 1 further including a filter arrangement located between the inlet and the hydrodynamic separation unit.

10. The mitigation device of claim 1 wherein the inlet is configured to produce an average shear rate in the range of 100/s to 5000/s.

11. The mitigation device of claim 1 further including the hydrodynamic separation unit configured to remove the bio-organic material in a non-ruptured state.

12. A harmful algae bloom (HAB) and/or transparent exopolymer particle (TEP) mitigation device comprising:
   a mobile body configured to move within or upon a body of water;
   a hydrodynamic separation system located on the mobile body, wherein the hydrodynamic separation system includes a water inlet for inputting water from the body of water within or upon which the mobile body is located, a hydrodynamic separation unit arranged to receive the water from the water inlet, and a collection tank, wherein the hydrodynamic separation unit includes bi-furcated outputs, a first output being a clean stream output line containing clean water and arranged to re-circulate the clean water back into the body of water, and a second output being a concentrate stream output line, the concentrate stream output line configured to place concentrate water containing harmful bio-organics found in at least one of HAB and TEP infested waters into the collection tank;
   a HAB and/or TEP sensor configured to detect the presence or absence of HAB and/or TEP infested waters;
   a source water inlet door or cover configured to cover and uncover the source water inlet, and positioned in relationship to the source water inlet wherein when the door or cover is positioned to cover the source water inlet, water is stopped from entering the system and from being processed and from being provided to the collection tank;
   a source water inlet door or cover controller configured to receive a signal from the HAB and/or TEP sensor, wherein the source water inlet door or cover controller acts to close the source water inlet door or cover over the source water inlet when the HAB and/or TEP sensor senses the absence of HAB and/or TEP infested waters and the source water inlet door or cover controller acts to open the source water inlet door or cover when the HAB and/or TEP sensor senses the presence of HAB and/or TEP infested waters:
   a power source located on the mobile body;
   an engine/steering unit, the engine/steering unit in operative connection to the power source to receive power to motivate movement of the mobile body, and wherein the steering portion of the engine/steering unit provides a capacity to move the mobile body in an intended direction; and
   a disinfection module to disinfect the bio-organic material.

13. A system for the removal of bio-organic material from a source of raw seawater and freshwater, the system comprising:
   at least one inlet for receiving at least one of raw seawater and freshwater;
   a membrane-less hydrodynamic separator unit arrangement including at least one separator unit for removing bio-organic material from the at least one of raw seawater and freshwater, the hydrodynamic separator unit having a curved configuration leading to a bifurcated outlet operative for passing treated seawater and/or freshwater via one outlet and for containment of concentrate fluid via another outlet;
   a pump mechanism for passing the treated seawater and/or freshwater from the membrane-less hydrodynamic separator unit; and
   a HAB and/or TEP sensor configured to detect the presence or absence of HAB and/or TEP infested waters;
   a source water inlet door or cover configured to cover and uncover the source water inlet, and positioned in relationship to the source water inlet wherein when the door or cover is positioned to cover the source water inlet, water is stopped from entering the system and from being processed and from being provided to the collection tank;
   a source water inlet door or cover controller configured to receive a signal from the HAB and/or TEP sensor, wherein the source water inlet door or cover controller acts to close the source water inlet door or cover over the source water inlet when the HAB and/or TEP sensor senses the absence of HAB and/or TEP infested waters and the source water inlet door or cover controller acts to open the source water inlet door or cover when the HAB and/or TEP sensor senses the presence of HAB and/or TEP infested waters;
   a water plant portion configured to receive the treated seawater and/or freshwater from the pump mechanism;
   wherein the system is a stationary system configured as part of a water treatment plant, that treats one of seawater and freshwater, wherein the bio-organic material comprises phytoplankton, algae, diatoms, seawater organisms, and TEP.

14. The system as set forth in claim 13 wherein the outlet for passing treated seawater, and/or fresh water is configured to return the treated clean stream can be returned to the source of the raw seawater.

15. The system as set forth in claim 13 wherein the separator unit comprises at least one curved portion that spans approximately 45 degrees and 360 degrees of angular distance along a diameter thereof.

16. The system as set forth in claim 15 wherein the raw seawater and/or freshwater is prescreened via a screen in front of the inlet to remove particulate matter.

17. The system as set forth in claim 13 wherein the hydrodynamic separator unit arrangement includes a plurality of curved particle separation units stacked such that the units are parallel to one another and all of the units are operatively connected to the inlet.

18. The mitigation device of claim 1, wherein the water inlet is configured and positioned in relationship to the hydrodynamic separation unit to intake water via at least one of wave action in the body of water and movement of the mobile body at a flow rate sufficient to operate the hydrodynamic separation unit.

19. The mitigation device of claim 1, further configured for the entire mobile device operates below a surface of the water, including the hydrodynamic separation system, the HAB and/or TEP sensor, the source water inlet door or cover, and the source water inlet door or cover.

20. The mitigation device of claim 12, wherein the water inlet is configured and positioned in relationship to the hydrodynamic separation unit to intake water via at least one of wave action in the body of water and movement of the mobile body at a flow rate sufficient to operate the hydrodynamic separation unit.

* * * * *